US009805625B2

(12) United States Patent
Feins et al.

(10) Patent No.: US 9,805,625 B2
(45) Date of Patent: Oct. 31, 2017

(54) SURGICAL SIMULATION ASSEMBLY

(71) Applicant: KindHeart, Inc., Chapel Hill, NC (US)

(72) Inventors: Richard H. Feins, Chapel Hill, NC (US); Tom Birchard, Chapel Hill, NC (US); W. Andrew Grubbs, Chapel Hill, NC (US); Don Aikin, Wake Forest, NC (US); Daniel C. Fuccella, Cary, NC (US)

(73) Assignee: KINDHEART, INC., Chapel Hill, NC (US)

( * ) Notice: Subject to any disclaimer, the term of this patent is extended or adjusted under 35 U.S.C. 154(b) by 101 days.

(21) Appl. No.: 14/340,265

(22) Filed: Jul. 24, 2014

(65) Prior Publication Data
US 2015/0024362 A1 Jan. 22, 2015

Related U.S. Application Data

(63) Continuation-in-part of application No. 13/882,421, filed as application No. PCT/US2011/058279 on Oct. 28, 2011, now Pat. No. 9,342,997.
(Continued)

(51) Int. Cl.
G09B 23/30 (2006.01)
A61G 13/08 (2006.01)

(52) U.S. Cl.
CPC .......... G09B 23/303 (2013.01); A61G 13/08 (2013.01); G09B 23/30 (2013.01); G09B 23/306 (2013.01)

(58) Field of Classification Search
CPC ...... G09B 23/28; G09B 23/30; G09B 23/303; G09B 23/306; A61G 13/02; A61G 13/08; A61G 13/10
See application file for complete search history.

(56) References Cited

U.S. PATENT DOCUMENTS 4,266,669 A * 5/1981 Watson .................. A61G 13/12
206/370
D293,820 S 1/1988 Guth et al.
(Continued)

FOREIGN PATENT DOCUMENTS

EP 2070487 6/2009
WO 2012/060901 5/2012
(Continued)

OTHER PUBLICATIONS

U.S. Appl. No. 15/138,427, filed Apr. 26, 2016.
(Continued)

Primary Examiner — Timothy A Musselman
(74) Attorney, Agent, or Firm — Allen, Dyer, Doppelt + Gilchrist, P.A. Attorneys at Law

(57) ABSTRACT

A surgical simulation assembly is provided for simulating realistic surgery on animal organs or human cadavers. The surgical simulation assembly comprises a generally flat tray having a central indentation for receiving an organ, at least one drainage aperture and at least one indented trough extending from the central indentation for receiving at least one tube. The tray is assembled with a simulator heart and lungs prepped for connection to a variable speed double action air pump assembly that creates both positive pressure and a vacuum on the heart to simulate a beating heart. The tray is supported on a basket having a lower containment portion for containing fluid waste collected during the simulated surgery. The basket is elevated by risers over a base designed to support the assembly.

16 Claims, 15 Drawing Sheets

Related U.S. Application Data

(60) Provisional application No. 61/408,413, filed on Oct. 29, 2010, provisional application No. 61/858,461, filed on Jul. 25, 2013.

(56) References Cited

U.S. PATENT DOCUMENTS

| | | | |
|---|---|---|---|
| 4,847,932 A * | 7/1989 | Baribault, Jr. | A61G 7/02 |
| | | | 4/452 |
| 5,217,003 A | 6/1993 | Wilk | |
| 5,425,644 A * | 6/1995 | Szinicz | G09B 23/28 |
| | | | 434/267 |
| 5,609,560 A | 3/1997 | Ichikawa et al. | |
| 5,791,908 A | 8/1998 | Gillio | |
| 5,792,135 A | 8/1998 | Madhani et al. | |
| 5,817,084 A | 10/1998 | Jensen | |
| 5,873,732 A * | 2/1999 | Hasson | G09B 23/286 |
| | | | 434/262 |
| 5,882,206 A | 3/1999 | Gillio | |
| 5,947,743 A | 9/1999 | Hasson | |
| 5,951,301 A | 9/1999 | Younker | |
| 6,331,181 B1 | 12/2001 | Tierney et al. | |
| 6,336,812 B1 | 1/2002 | Cooper et al. | |
| 6,441,577 B2 | 8/2002 | Blumenkranz et al. | |
| 6,491,701 B2 | 12/2002 | Tierney et al. | |
| D471,641 S | 3/2003 | McMichael et al. | |
| 6,659,939 B2 | 12/2003 | Moll et al. | |
| 6,780,016 B1 | 8/2004 | Toly | |
| 6,790,043 B2 | 9/2004 | Aboud | |
| 6,817,974 B2 | 11/2004 | Cooper et al. | |
| D565,743 S | 4/2008 | Phillips et al. | |
| 7,413,565 B2 | 8/2008 | Wang et al. | |
| D608,456 S | 1/2010 | Sandel | |
| D618,821 S | 6/2010 | Larsen | |
| 7,798,815 B2 * | 9/2010 | Ramphal | G09B 23/306 |
| | | | 434/262 |
| D638,137 S | 5/2011 | Gross et al. | |
| 7,963,913 B2 | 6/2011 | Devengenzo et al. | |
| D650,912 S | 12/2011 | Tomes et al. | |
| D676,573 S | 2/2013 | Austria | |
| 8,600,551 B2 | 12/2013 | Itkowitz et al. | |
| 8,656,929 B2 | 2/2014 | Miller et al. | |
| D704,856 S | 5/2014 | Tomes et al. | |
| 9,259,289 B2 | 2/2016 | Zhao et al. | |
| 9,271,798 B2 | 3/2016 | Kumar et al. | |
| 2004/0033477 A1 | 2/2004 | Ramphal et al. | |
| 2006/0087746 A1 | 4/2006 | Lipow | |
| 2006/0178559 A1 | 8/2006 | Kumar et al. | |
| 2006/0258938 A1 | 11/2006 | Hoffman et al. | |
| 2007/0156017 A1 | 7/2007 | Lamprecht et al. | |
| 2009/0088634 A1 | 4/2009 | Zhao et al. | |
| 2010/0169815 A1 | 7/2010 | Zhao et al. | |
| 2010/0274087 A1 | 10/2010 | Diolaiti et al. | |
| 2012/0290134 A1 | 11/2012 | Zhao et al. | |
| 2013/0038707 A1 | 2/2013 | Cunningham et al. | |
| 2013/0107207 A1 | 5/2013 | Zhao et al. | |
| 2013/0226343 A1 | 8/2013 | Baiden | |
| 2013/0330700 A1 | 12/2013 | Feins et al. | |
| 2014/0135648 A1 | 5/2014 | Holoien et al. | |
| 2014/0186809 A1 | 7/2014 | Hendrickson et al. | |
| 2014/0236175 A1 | 8/2014 | Cooper et al. | |
| 2014/0282196 A1 | 9/2014 | Zhao et al. | |
| 2014/0329217 A1 | 11/2014 | Barsness et al. | |
| 2015/0257958 A1 * | 9/2015 | Allen | A61G 13/10 |
| | | | 108/49 |
| 2016/0314710 A1 | 10/2016 | Jarc et al. | |

FOREIGN PATENT DOCUMENTS

| | | |
|---|---|---|
| WO | 2012058533 | 5/2012 |
| WO | 2015095715 | 6/2015 |

OTHER PUBLICATIONS

U.S. Appl. No. 15/138,403, filed Apr. 26, 2016.
U.S. Appl. No. 15/138,445, filed Apr. 26, 2016.
U.S. Appl. No. 61/554,741, filed Nov. 2, 2011.
Turner, A. Simon; Experiences with sheep as an animal model for shoulder surgery: Strengths and shortcomings; Journal of Shoulder and Elbow Surgery Board of Trustees; Sep./Oct. 2007; vol. 16, No. 5S; pp. 158S-163S.
La Torre, et al.; Resident training in laparoscopic colorectal surgery: role of the porcine model; World J. Surg.; Sep. 2012;36(9):2015-20; 2pp.; Abstract only.
Feins, Richard H.; Expert commentary: Cardiothoracic surgical simulation; The Journal of Thorascic and Cardiovascular Surgery; 2008; vol. 135, No. 3; pp. 485-486.
Hicks, et al.; Cardiopulmonary bypass simulation at the Boot Camp; The Journal of Thoracic and Cardiovascular Surgery 141(1):284-92—Apr. 2010; 2pp. Abstract only.
Ramphal, et al.; A high fidelity tissue-based cardiac surgical simulator; European Journal of Cardio-Thoracic Surgery 27 (2005) 910-916.
Tesche, et al.; Simulation experience enhances medical students' interest in cardiothoracic surgery; Ann Thorac Surg. Dec. 2010;90(6): 1967-73, discussion 1973-4. doi: 10.1016/j.athorascur. 2010.06/117; 1 page; Abstract only.

* cited by examiner

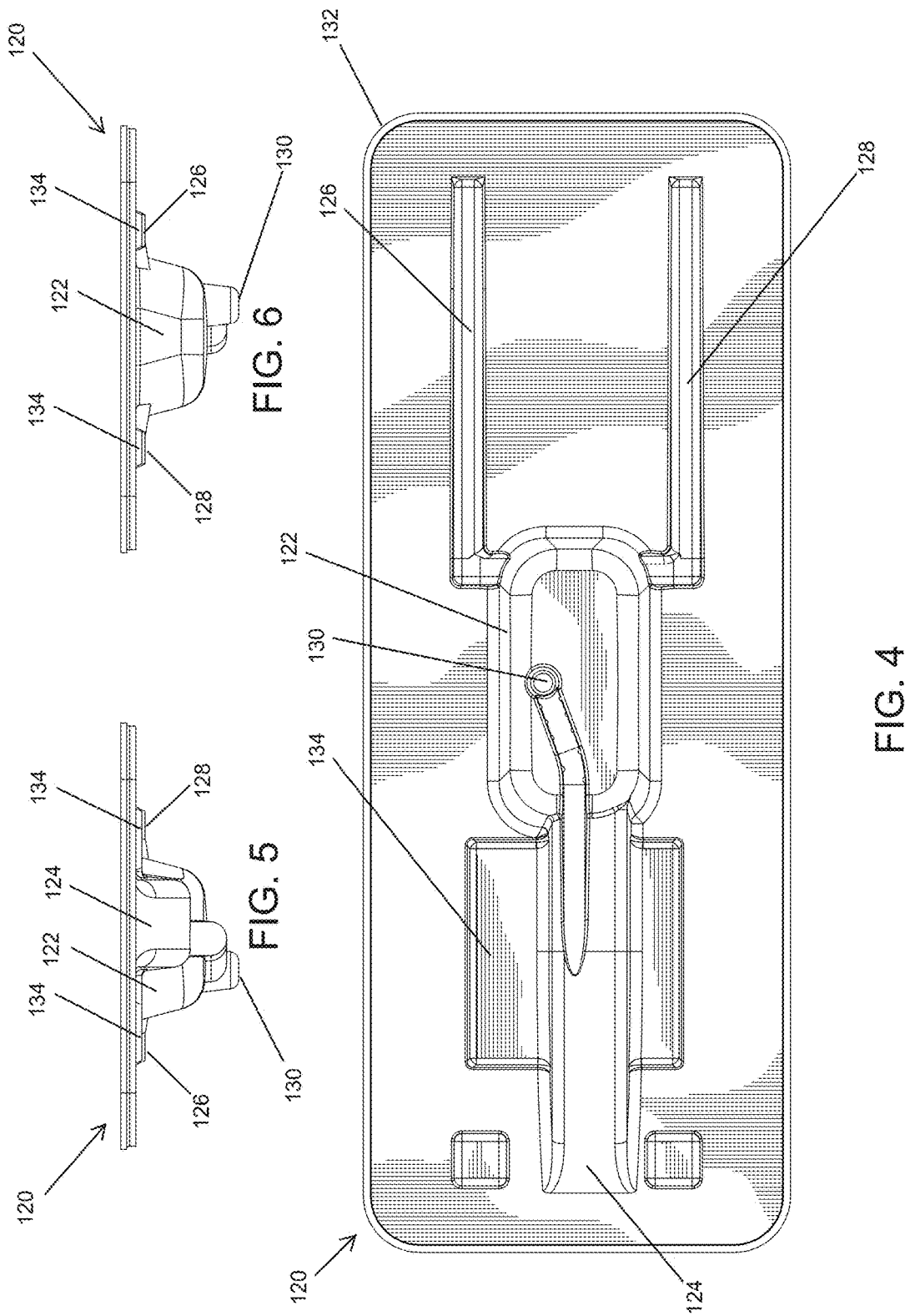

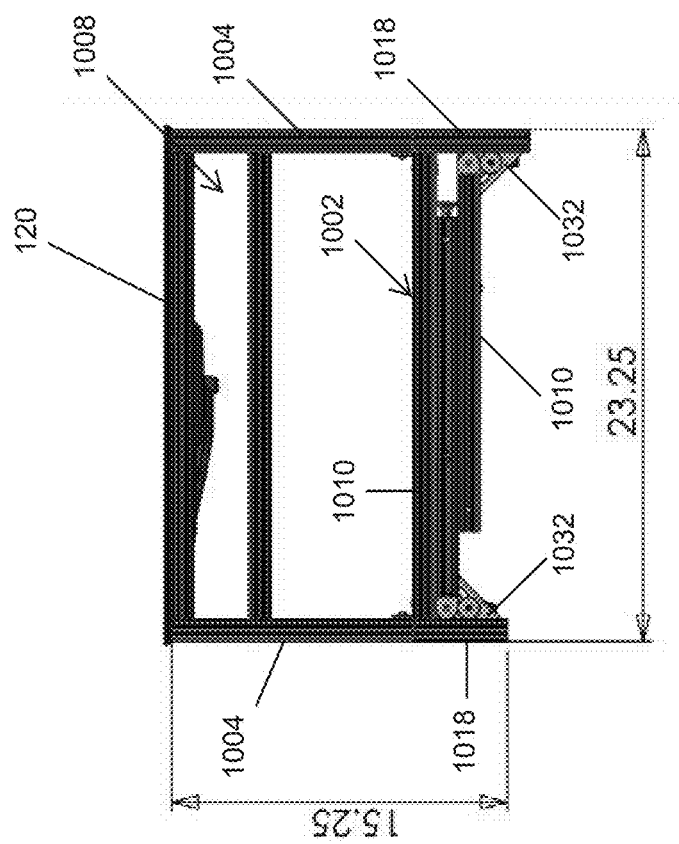
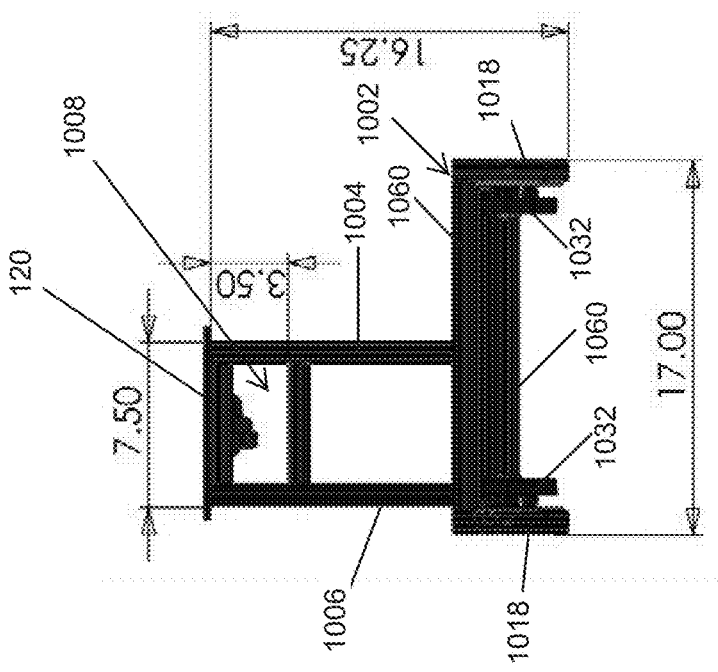
FIG. 15
FIG. 14

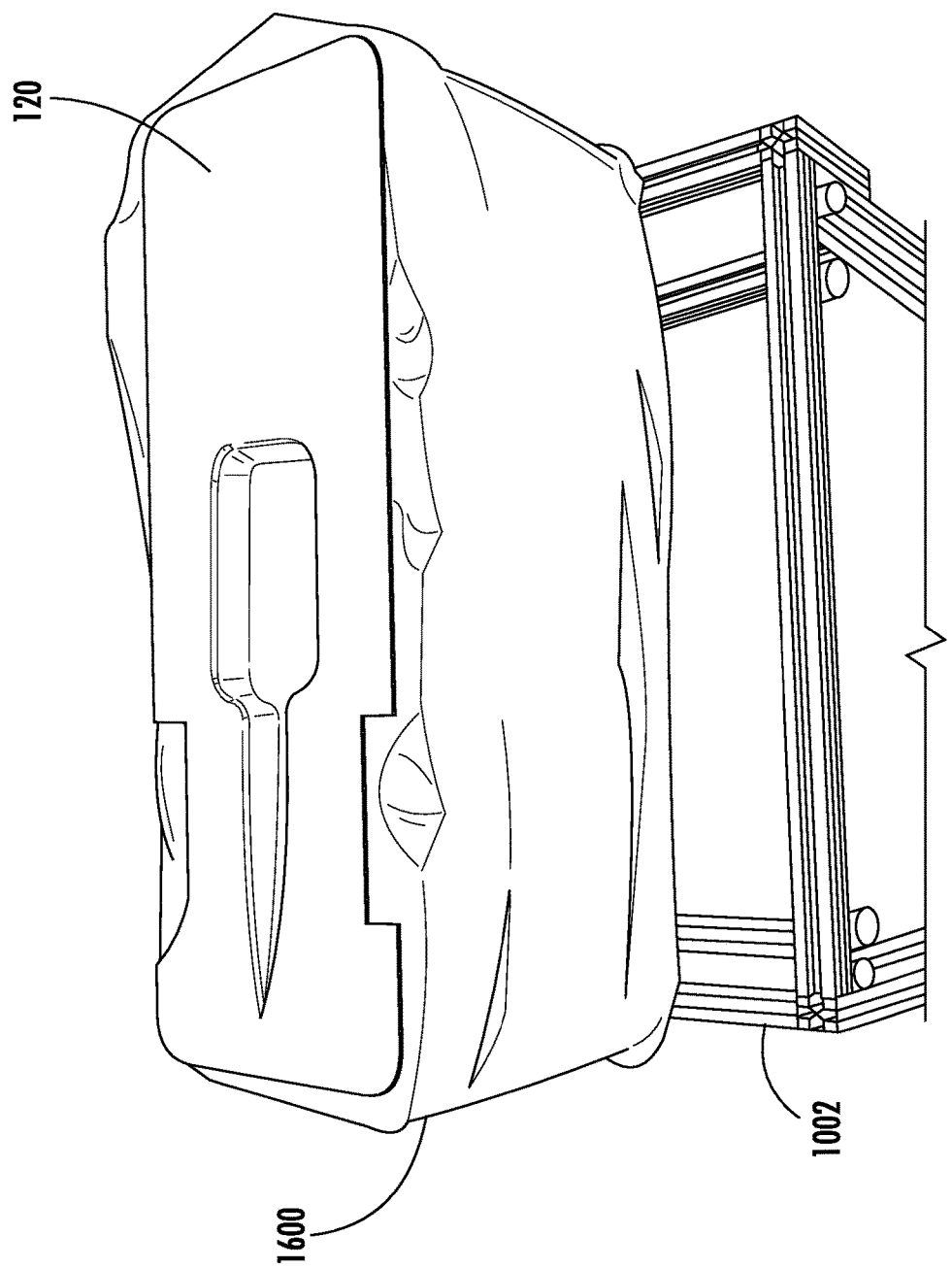

SURGICAL SIMULATION ASSEMBLY

CROSS-REFERENCE TO RELATED APPLICATIONS

This application is a continuation-in-part of U.S. Ser. No. 13/882,421, titled MODULAR STAGED REALITY SIMULATOR, which is a national stage application of PCT/US2011/058279, having an international filing date of Oct. 28, 2011, and which claims priority to U.S. Provisional Application Ser. No. 61/408,413 filed on Oct. 29, 2010. This application further claims priority of U.S. Provisional Application Ser. No. 61/858,461, filed on Jul. 25, 2013, titled TABLE AND ASSEMBLY FOR SURGICAL SIMULATIONS. All of the aforementioned applications are incorporated into this application by reference in their entirety.

FIELD OF THE INVENTION

This invention relates generally to an assembly used for surgical simulations to allow for realistic surgical training on animal or cadaver hearts and lungs. In particular, the invention relates to a support and tray assembly, where the tray is molded with indentations for the receipt of organs and air hoses to simulate realistic surgical conditions on the heart and lungs of the animal or cadaver for purposes of training or certifying medical professionals.

BACKGROUND OF THE INVENTION

Surgical skill training is imperative before a surgeon or surgical trainee attempts surgery on live patients. New surgical procedures are constantly being developed that require both surgeons and surgical trainees to practice new surgical procedures before operating on live patients.

Historically, surgical training has been provided through apprenticeships almost exclusively offered in hospital settings. Residents performed surgery under the supervision of more experienced surgeons. The type of situations presented to the surgeon trainee was largely driven by chance as the nature and timing of situations needing surgery found in patients was not under anyone's control. This model of using a stream of situations as presented by clinical service of human patients does not provide a model for repetition until mastery. As the number of hours that residents are available for surgery has decreased, the range of surgical events presented to surgical residents has also decreased. The failure rate for surgery board certifications exams is now in the range of 26%. For specialized board certifications such as thoracic surgery, the rate has been as high as 33%.

For this reason, simulators that provide for realistic surgical environments for surgical training purposes have become increasingly valuable tools. Many known surgical training stimulators exists that use organ models or computer-generated virtual reality systems. These training simulators, however, only provide limited realism and are expensive. For this reason, often times, anaesthetized animals are used for vivo training. However, ethical concerns surrounding the use of the live animals for training is a concern for some.

More recently, simulators have been developed that allow for a full operative experience with cardiac surgery and with lung surgery (both open and thoracoscopic) without the use of live animals. Such lifelike simulators can use either animal (e.g., porcine) organs, or human cadaver organs for surgery education and training. The simulators use organs that have been re-animated using hydraulics, reperfusion, and computer orchestration, and are then placed in a human equivalent model.

In one example, the model uses a porcine heart that is prepared with an intraventricular balloon in each ventricle. The balloons are inflated by a computer controlled activator. The computer program is able to simulate the beating heart, various cardiac arrhythmias, hypo- and hypertensive states, cardiac arrest, and even placement of an intra-aortic balloon pump. The model is perfused with a washable blood substitute. When placed in a replica of the pericardial well in a mannequin, the RCSS is capable of duplicating most aspects of cardiac surgery including all aspects of cardiopulmonary bypass, coronary artery bypass grafting both on and off bypass, aortic valve replacement, heart transplantation, and aortic root reconstruction. The computer protocols also make experience with adverse events such as accidental instillation of air into the pump circuit, aortic dissection, and sudden ventricular fibrillation after discontinuation of cardiopulmonary bypass possible.

Descriptions of work on surgical simulators are found in Feins et al. WO2012/058533; Ramphal et al. U.S. Pat. No. 7,798,815; Cooper et al. U.S. Pat. No. 6,366,101; and Younker U.S. Pat. No. 5,951,301, all of which are incorporated by reference in their entireties into this application.

A need exists to help facilitate and easily repeat such realistic surgical simulations to increase the educational experience and practice achieved thorough the introduction of the new surgical simulators on animal and cadaver organs. In particular, a need exists for the quick and easily set-up, as well as disposal of the organs, so that such simulations can be repeatedly performed without unnecessary down-time in most any environment. In this manner, procedures, tools and techniques can be demonstrated and practiced repeatedly, with minimal downtime between simulations, in most any environment.

SUMMARY

A surgical simulation assembly is provided for simulating realistic surgery on animal organs or human cadavers. The surgical simulation assembly comprises a generally flat tray having a central indentation for receiving an organ, at least one drainage aperture and at least one indented trough extending from the central indentation for receiving at least one tube. The tray is assembled with a simulator heart and lungs prepped for connection to a variable speed double action air pump assembly that creates both positive pressure and a vacuum on the heart to simulate a beating heart.

The tray is supported on a basket having a lower containment portion for containing fluid waste collected during the simulated surgery. The basket is elevated by risers over a base member designed to support the assembly. The risers may be slideably engaged with the base to adjust the location of the basket relative to the base. The base may further include a plurality of adjustable height legs to allow the base to act as a table.

In operation, the basket of the support structure is lined to catch fluid waste from the tray. In one example, the basket may be lined with a containment bag. The prepped surgical simulation tray is then placed on the basket. The simulator heart is connected to the air pump to simulate a heartbeat. Once the surgery is completed, the organs are disconnected from the air pump and any other extraneous devices or elements (i.e., IV for perfusion of fluids). The tray and organs can then be placed within the containment bag, along with any collected fluid and disposed. Another containment bag can then line the basket and another prepped tray can then be place on the basket to simulate another surgery.

The invention also provides an improved air pumping assembly for a surgical simulation which comprises a variable speed double action air pump that creates both positive pressure and a vacuum.

Certain aspects of the teachings contained within this disclosure are addressed in the claims submitted with this application upon filing. Rather than adding redundant statements of contents of the claims, these claims should be considered incorporated by reference into the summary. The summary is meant to provide an introduction to the concepts that are disclosed within the specification without being an exhaustive list of the many teachings and variations upon those teachings that are provided in the extended discussion within this disclosure. Thus, the contents of the summary should not be used to limit the scope of the claims that follow.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Further, it is not necessary to provide examples of every possible combination of the inventive concepts described in this application as one of skill in the art will recognize that inventive concepts illustrated in the application can be combined together in order to address a specific application or modified based upon concepts known in the art to address specific applications.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 4 illustrates a plan view of the surgical simulation tray of FIG. 2.

FIG. 5 illustrates a front elevation view of the surgical simulation tray of FIG. 2.

FIG. 6 illustrates a rear elevation view of the surgical simulation tray of FIG. 2.

FIG. 14 illustrates a side elevation view of the surgical simulation support structure of FIG. 13.

FIG. 15 illustrates a rear elevation view of the surgical simulation support structure of FIG. 13.

FIG. 16 illustrates a top perspective view the surgical simulation support structure of FIG. 13 having a containment bag placed within the basket of the support structure and having the tray positioned on the upper support portion of the basket.

DETAILED DESCRIPTION OF THE INVENTION

Figure 1:
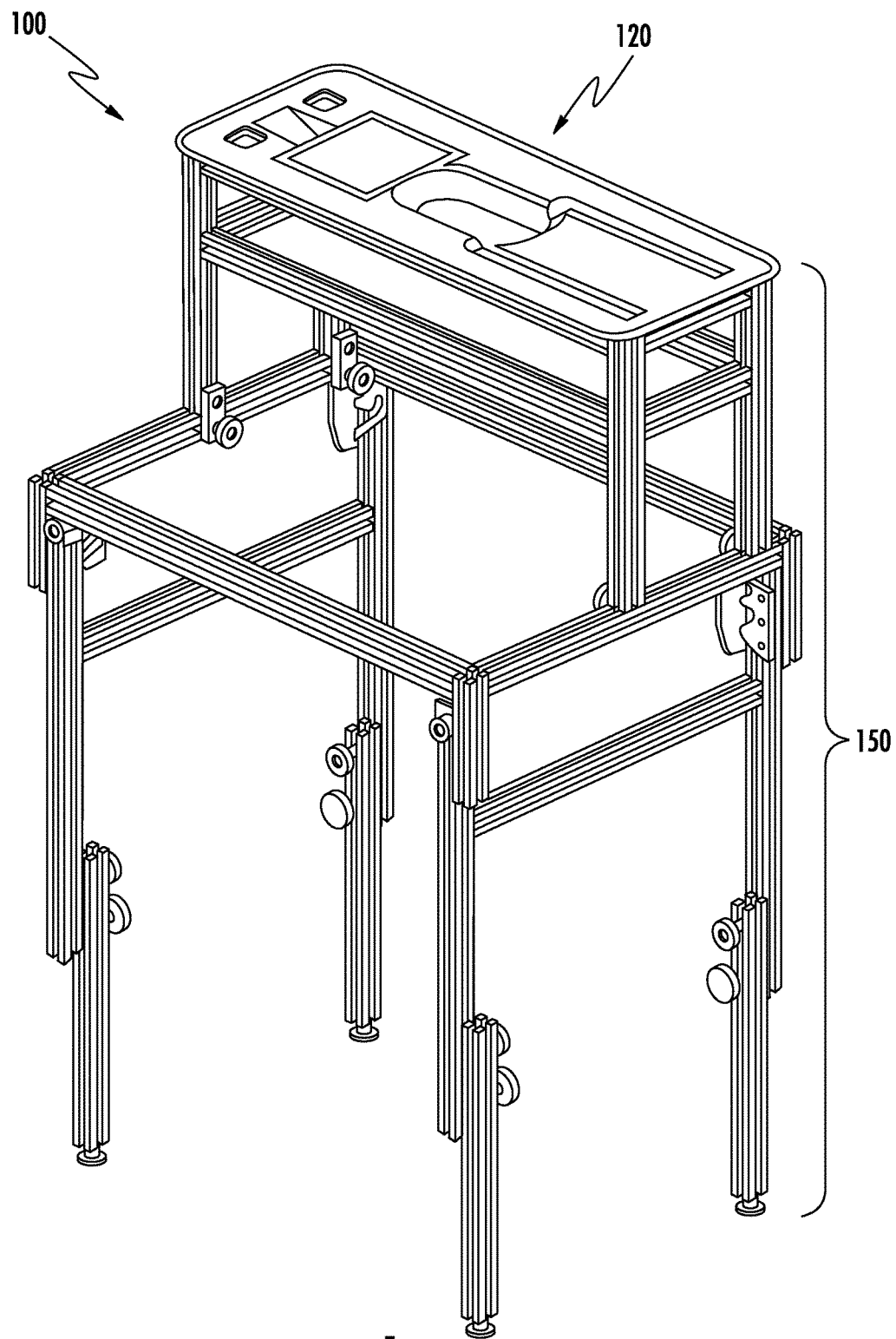
FIG. 1 illustrates a top perspective view of one example of one implementation of a surgical simulation assembly of the present invention.
Figure 19:
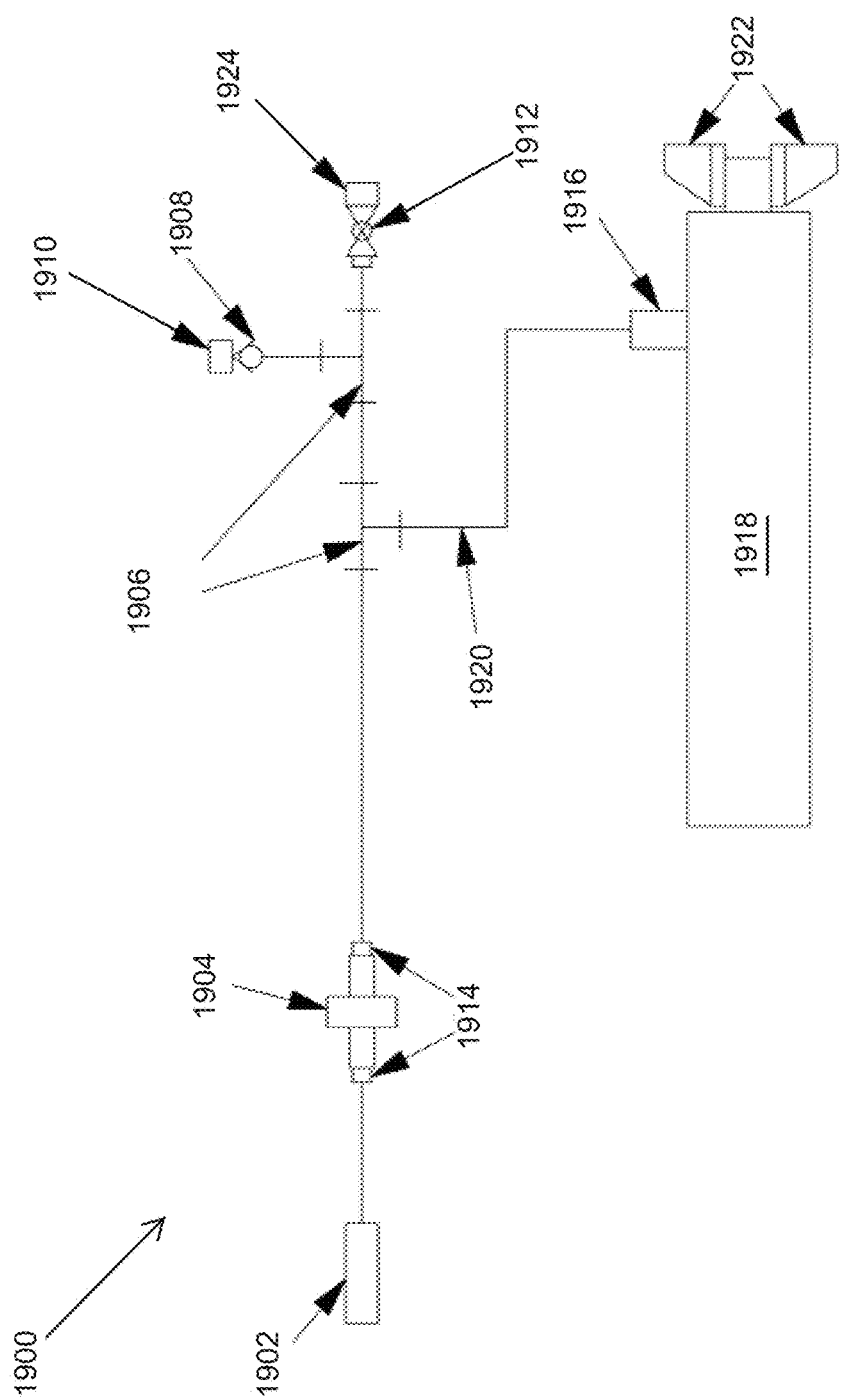
FIG. 19 illustrates a schematic of one example of one implementation of an air pump assembly for use in connection with the present invention.

FIG. 1 illustrates a top perspective view of one example of a surgical simulation assembly 100 of the present invention. The surgical simulation assembly 100 includes a surgical simulation tray 120 (see FIGS. 2-9) and a surgical simulation support 150 (see FIGS. 10-16) for supporting and elevating the surgical simulation tray 120 during surgical simulation. As will also be explained further below, for simulation, the tray 120 accompanied by a surgical organ block 1700 (FIG. 17), such as prepped animal or cadaver heart and/or lungs affixed to the tray 120 for use in the surgical simulation procedure (See FIGS. 17-110). The surgical procedure may be simulated through the use of an air pump (FIG. 19).

Unless defined otherwise, all technical and scientific terms used in this application have the same meaning as commonly understood by one of ordinary skill in the art to which this invention belongs. The article "a" and "an" are used herein to refer to one or more than one (i.e., to at least one) of the grammatical object(s) of the article. By way of example, "an element" means one or more elements.

Throughout the application the word "comprising," or variations such as "comprises" or "comprising," will be understood to imply the inclusion of a stated element, integer or step, or group of elements, integers or steps, but not the exclusion of any other element, integer or step, or group of elements, integers or steps. The present invention may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Figure 2:
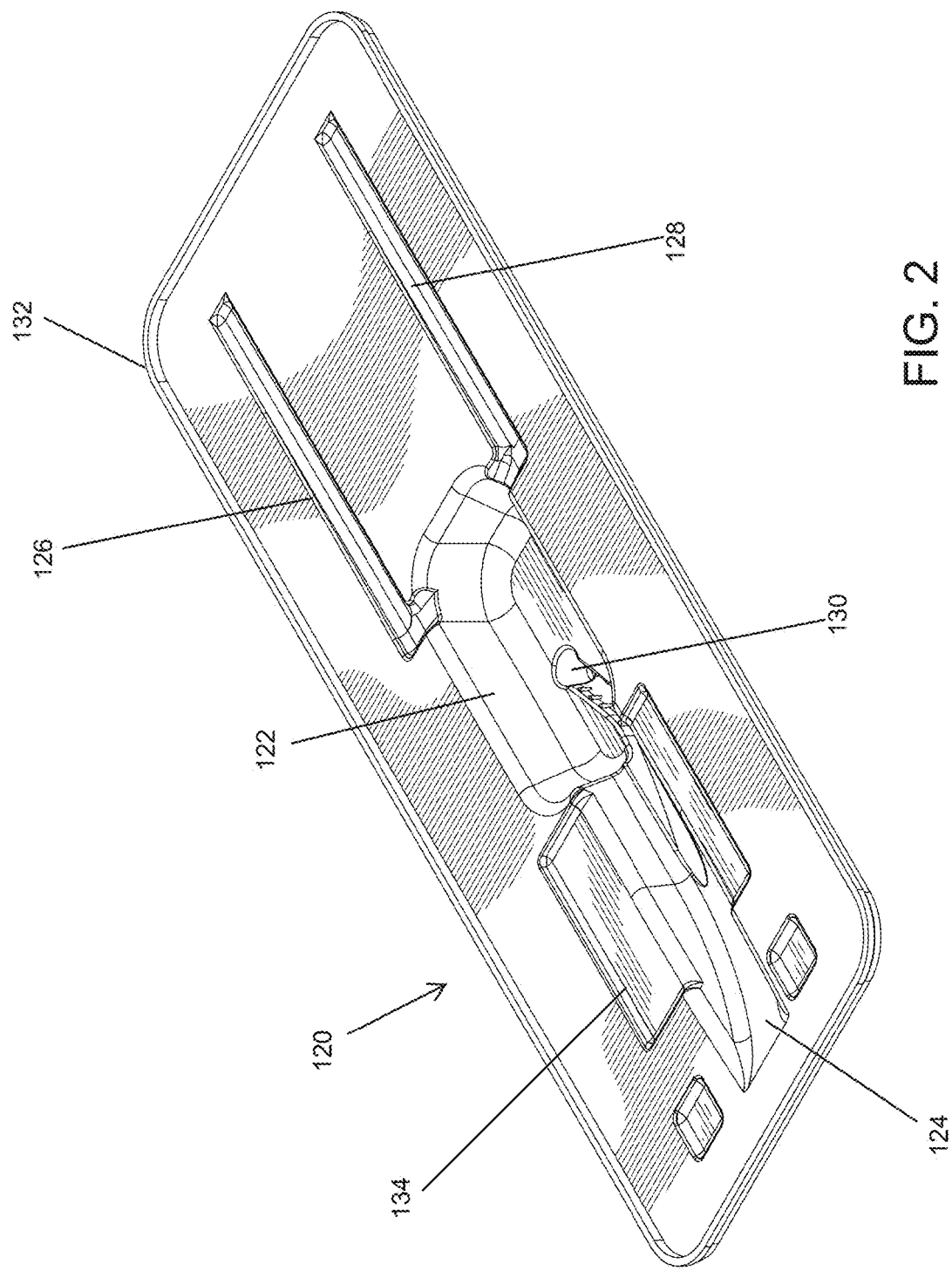
FIG. 2 illustrates a top perspective view of one example of one implementation of a surgical simulation tray of the present invention.
Figure 3:
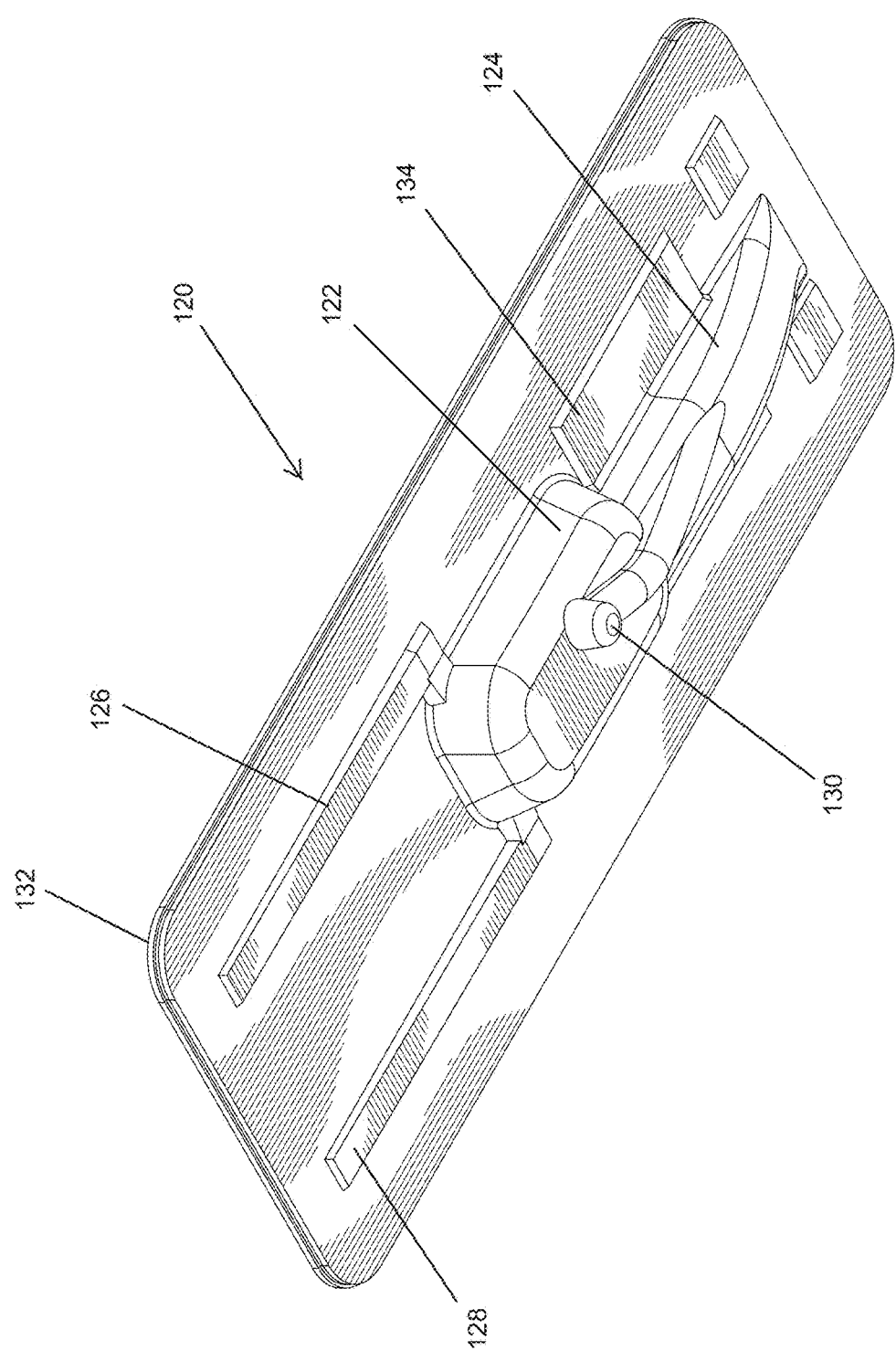
FIG. 3 illustrates a bottom perspective view of the surgical simulation tray of FIG. 2.

Turning now to FIGS. 2 and 3, FIGS. 2 and 3 illustrate top and bottom perspective views, respectively, of one example of a surgical simulation tray 120 of the present invention. In the illustrated example, the tray 120 comprises a generally flat rectangular tray 120 that may be molded, or alternatively, machined, or formed using 3D printing technology. The tray 120 includes indentations sized to receive organs 122, a graduated trough for housing tube and hoses 124, channels for housing additional tubes 126 and 1210 and a drainage channel with aperture 130. The hoses may be air hoses and tubes housed in the trough 124 and channels 126 and 1210 to simulate a beating heart or blood flood through the simulated organs. The tray 120 further includes a plate recess 134 for containing the tubes and hoses within the trough 124. Tray 120 further includes a raised perimeter 132, creating a boundary for the tray 120 to assist in maintaining items on the tray 120.

As best illustrated by FIG. 4, which illustrates a plan view of the surgical simulation tray 120 of FIG. 2, the central indentation 122 is sized to receive at least part of a porcine heart, thereby creating an organ cavity. Extending from the central indentation 122 are one or more troughs 124 and/or channels 126, 1210 for housing tubes and hoses connected to the simulator organs. In operation, the tubes and hoses may provide some combination of one or more pneumatic supply lines, one or more pressurized fluid supply lines or, optionally, one or more instrument communication buses. To keep the hoses within the trough 124 and channels 126, 1210, a plate (not shown) may be positioned within a plate recess 134 created in the tray 120. The plate, when positioned in the plate recess 134, covers the hoses before affixing the simulator organs to the tray 120. In this manner, the tubes are concealed under the organs to create a more realistic surgical environment.

In the illustrated example, the tray 120 is designed for use with porcine organs. However, those skilled in the art will recognize that the tray may be utilized in connection with or specifically designed to be utilized in connection with other animal organs, as well as human cadaver organs.

Figure 7:
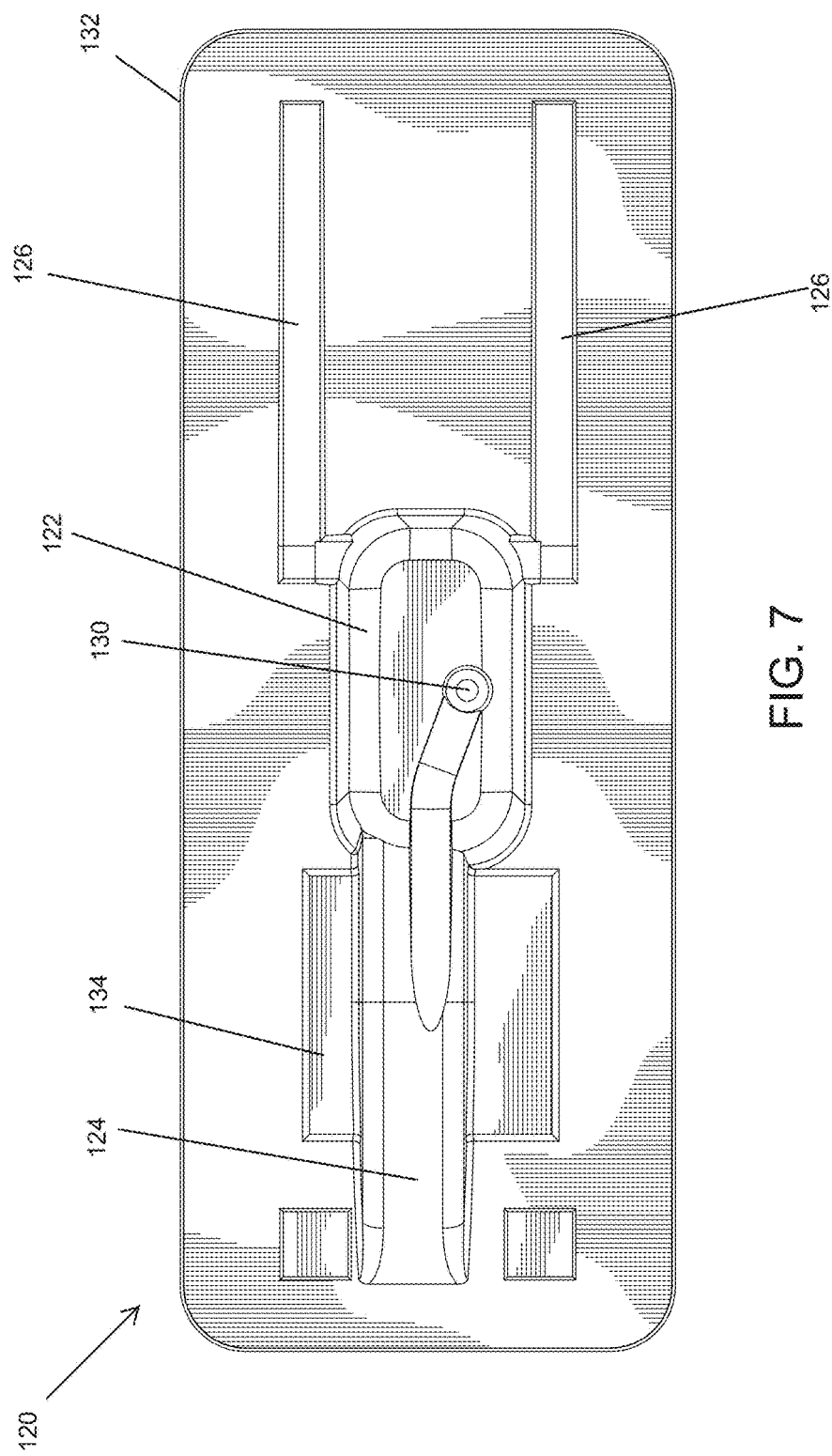
FIG. 7 illustrates a bottom view of the surgical simulation tray of FIG. 2.
Figure 8:
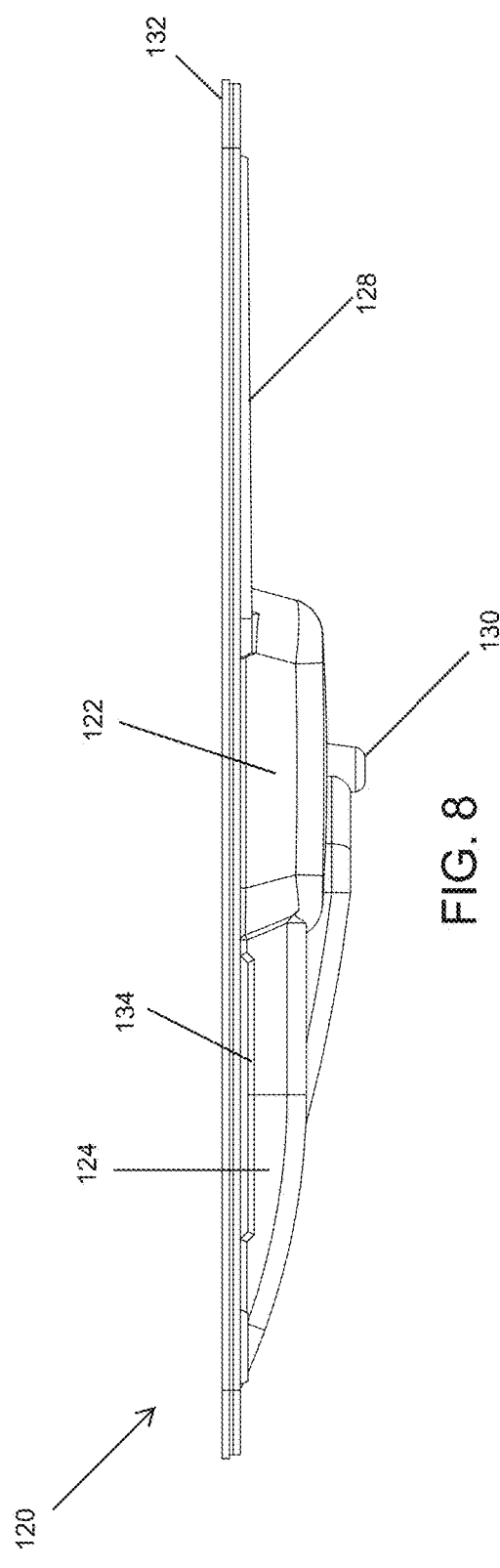
FIG. 8 illustrates a right side view of the surgical simulation tray of FIG. 2.
Figure 9:
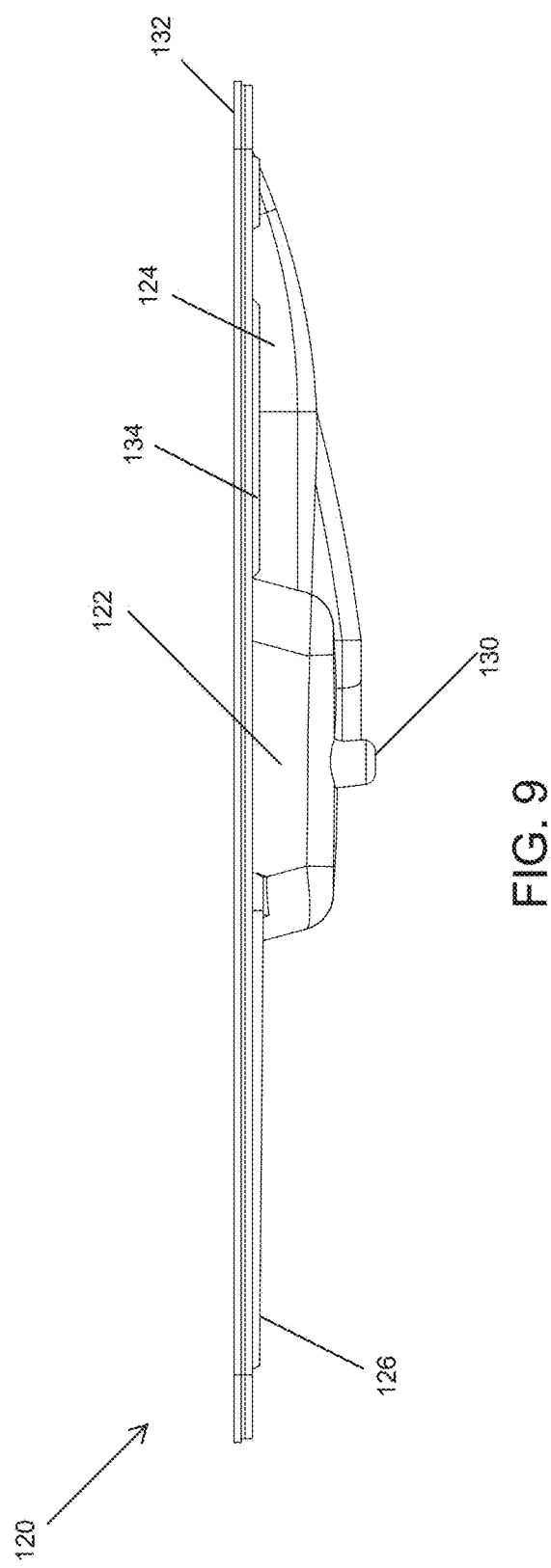
FIG. 9 illustrates a left side view of the surgical simulation tray of FIG. 2.

FIGS. 5 and 6 illustrate front and back elevation views of the surgical simulation tray of FIG. 2. FIGS. 5 and 6, along with FIGS. 8 and 9, which illustrate right and left sides elevation views of the surgical simulation tray 120, respectively, best show the contour and extension of central indentation 122, the graduated trough 124 and channels 126 and 1210, and the plate recess 134 below the surface of the tray 120. Similarly, FIG. 7 illustrates a bottom view of the surgical simulation tray of FIG. 2, which illustrates the drainage aperture 130, in additional to the molded central indentation 122, the graduated trough and channels 126 and 1210 and the plate recess 134.

Figure 10:
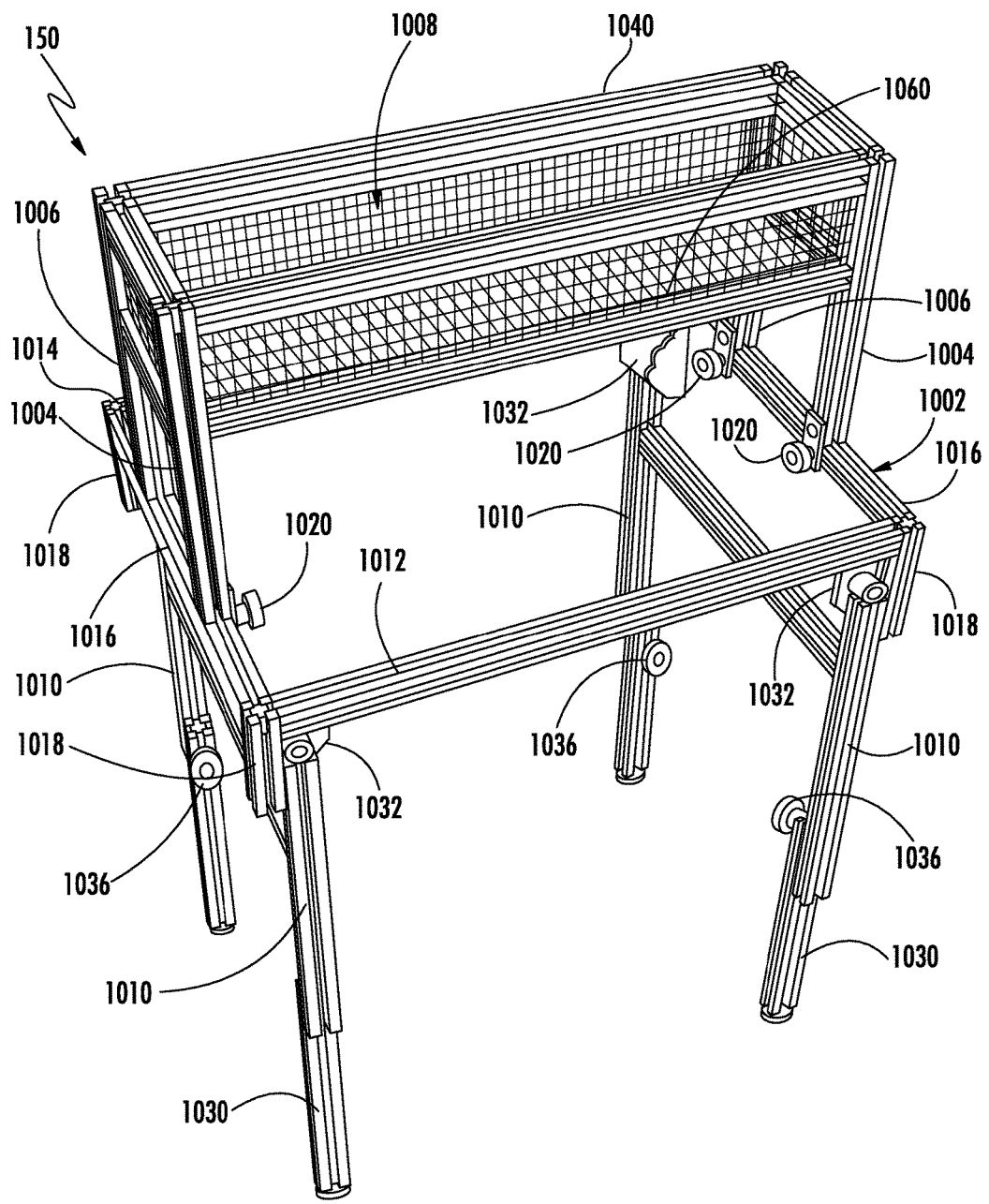
FIG. 10 illustrates a top perspective view of one example of one implementation of a surgical simulation support structure for supporting the surgical simulation tray an elevated position.

A support structure may further be provided as part of the surgical simulation assembly 100 that supports the surgical simulation tray 120 in an elevated position for surgical demonstration. FIG. 10 illustrates a top perspective view of one example of one implementation of a surgical simulation support structure 150 for supporting the surgical simulation tray 120 in an elevated position.

As illustrated in FIG. 10, the surgical simulation support structure 150 includes a base frame or lower support frame 1002 and risers 1004, 1006, which elevate a basket or upper support frame 1008 over the base frame member 1002. The base frame 1008 may be supported directly on a table or may include a plurality of legs 1010, as illustrated in FIG. 10, to support the base frame 1002 at a desired height for performing simulated surgery.

As illustrated in FIG. 10, the base frame 1002 may be defined by a front rail 1012, back rail 1014, and opposing side rails 1016. The risers 1004, 1006 may be slideably connected to the base frame 1002 with clamping knobs 1020 that slideably position the basket 1008 along the base frame 1002 such that the basket 1008 may move along the base frame 1002 from front to back to adjust the location of the basket 1008 along the base frame 1002. In this manner, the basket 1008 is affixed to the table so as to be centered on the base frame 1002 or positioned to one side or the other side of the base frame 1002. By allowing for the adjustment of the basket 1008 from front to back along the base frame 1002, a robot controlled instrument may enter the simulation organ from below the simulation organ.

When legs 1010 are desired to be attached to the base frame 1002, the plurality of legs 1010 may be affixed directly to the base frame 1002. Alternatively, and as illustrated, the legs 1010 may be connected to the base frame 1002 in a manner that permits the legs 1010 to fold and be stored underneath and within the boundaries of the base frame 1002 when not in use.

When foldable legs 1010 are desired for use in connection with the base frame 1002, downwardly extending connecting members 1018 may be affixed to the corners of the base frame 1002 to interconnect with the legs 1010. In addition to being foldable, the legs 1010 may also be adjustable for height.

To fold the legs 1010 inward, underneath the base frame 1002, ninety degree pivot support assemblies, with spring loaded handles 1032, are affixed between the downwardly extending connecting members 1018 and the legs 1010. In this manner, the releasing of the spring loaded handles of the pivot support assemblies can release the legs 1010 from their open position and allow them to fold inward to a folded or closed position underneath the base frame 1002.

The legs 1010 may also include leg extensions 1030 that adjust the height of the legs 1010. The leg extensions 1030 may slideably affixed to the legs 1010 and adjustable along the length of the legs 1010 through the use of clamping knobs 1036. To allow for the folding of the legs 1010 underneath the base frame 1002, the length of the legs 1010 may be adjusted to be less than the width of the base 1002 such that the legs 1010 when the leg extensions 1030 are fully retracted and folded underneath the base frame 1002, the legs will be contained underneath the base frame 1002 as illustrated in FIGS. 13 through 16.

As better illustrated in connection with FIGS. 17 and 18, the support structure 150 may be designed so that an organ block or partial torso may be located on top of the tray 120. The assembly 100 may also include straps or other attachment mechanisms for attaching the organ block or partial torso to the tray 120. The assembly may also be equipped with a pole for hanging an intravenous (IV) fluid line(s).

When the legs 1010 extend and fold, the support structure 150 may be collapsed to fit inside an appropriately sized carrying case (aka shipping crate), a suitcase or other container suitable for transport. It would also be designed to fit easily into the truck of a car to assist with visits to hospitals, surgical instrument providers, or other training venues.

Figure 11:
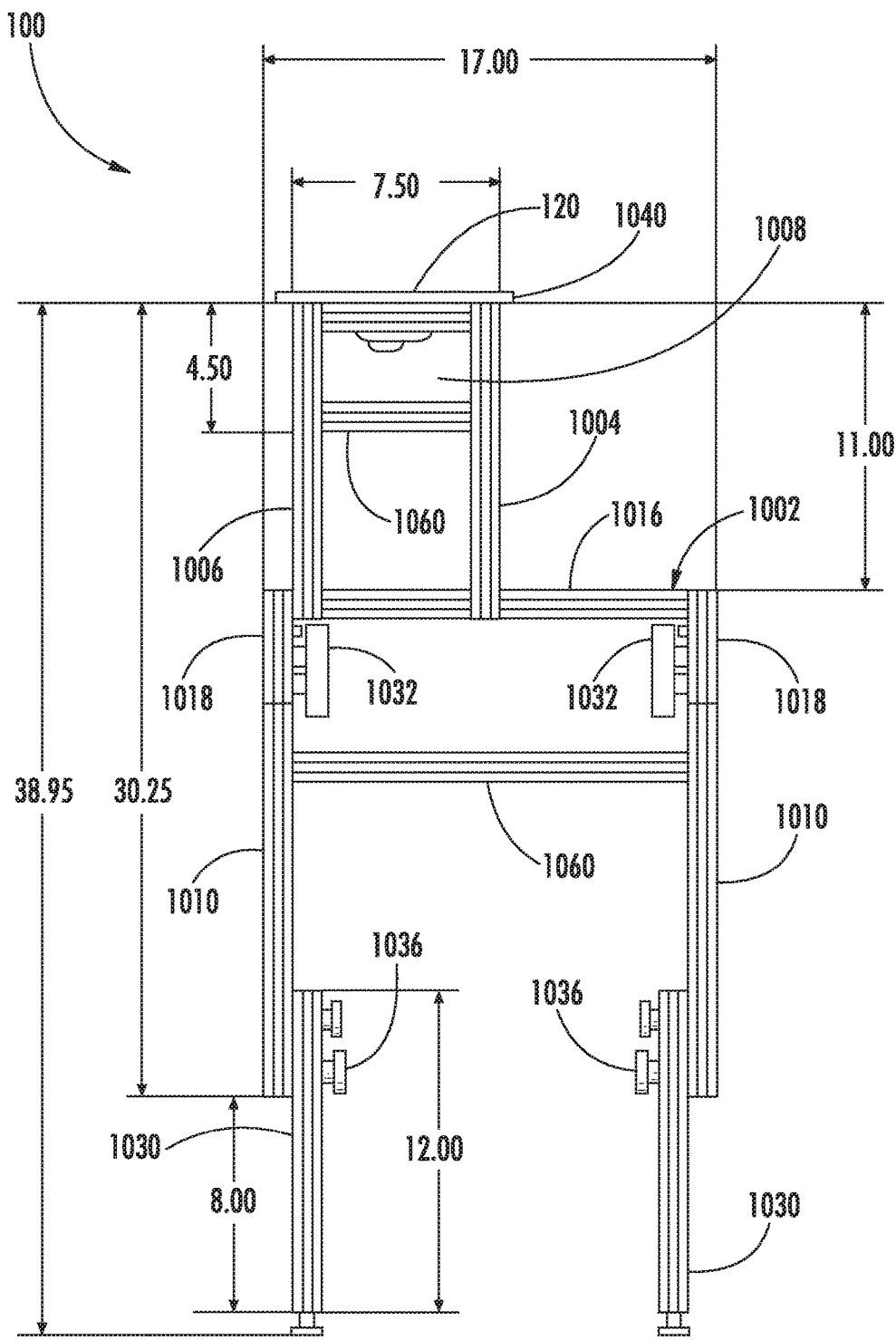
FIG. 11 illustrates a side elevation view of the surgical simulation support structure of FIG. 10.
Figure 12:
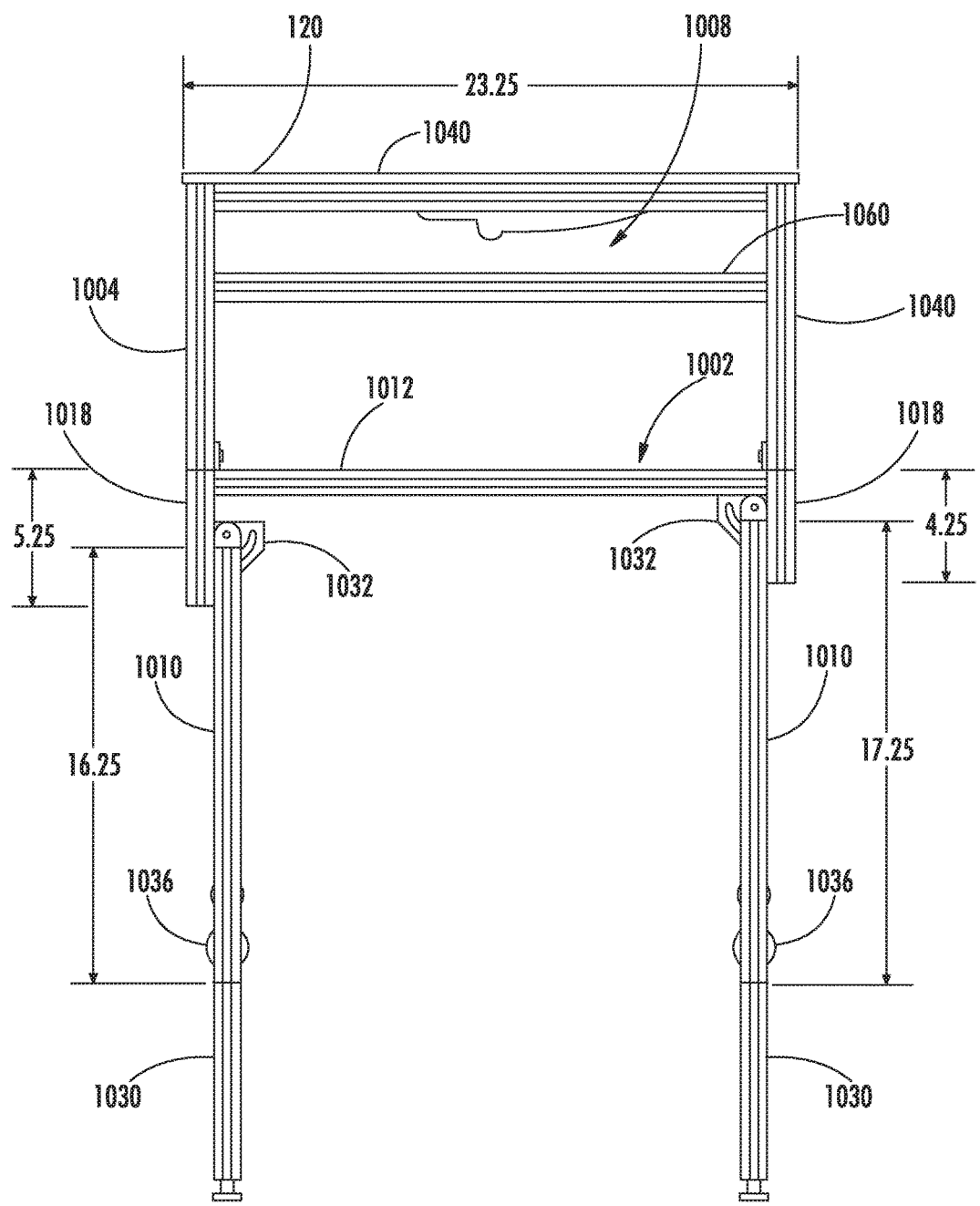
FIG. 12 illustrates a rear elevation view of the surgical simulation support structure of FIG. 10.

FIGS. 11 and 12 illustrate one example of possible dimensions for the surgical simulation support structure 150 of the invention. FIG. 11 illustrates a side elevation view of the surgical simulation support structure of FIG. 10, whereas, FIG. 12 illustrates a rear elevation view of the surgical simulation support structure of FIG. 10.

In this example, the surgical simulation support structure 150 is provided with foldable adjustable legs 1010. As illustrated, the risers 1004, 1006 elevate the surgical simulation tray 120 approximately 11 inches off of the base frame 1002. The basket 1008, from top to bottom, comprises approximately 4½ inches of the total height of the risers 1004, 1006. The 4½ inch basket 1008 is positioned at the top of the risers 1004, 1006 and includes an upper support portion 1040 defined by the perimeter opening of the basket 1008. The upper support portion 1040 is designed to support the surgical simulation tray 120. The upper support portion 1040 of the basket 1008 used to support the surgical tray 120 is approximately 23¼ inches in length (measure from side to side) by 7½ inches wide (measured from front to back).

The indentation 122, trough 124, channels 124, 126 and drainage aperture 130 within the tray 120 are positioned within the basket 1008 of the risers 1004, 1006 when placed upon the upper support portion 1040. In this manner, when the basket 1008 is lined with a containment device, such as a containment bag, the fluid from the tray 120 flows through the apertures 130 in the tray 120. The fluid is then collected by the containment bag positioned within the basket 1008.

The base frame 1002 is approximately the same length as the basket 1008 and has a width, in the illustrated example, of approximately 17 inches from front to back.

When the legs 1010 are designed to be retracted and foldable underneath the base frame 1002, it is required that opposing legs 1010 be attached at different positions along the 1018 connecting members 1018 to allow the legs 1010 to fold one on top of the other. In this manner, the leg 1010 affixed along its respective downwardly extending connecting member 1018 at a point higher than the opposing leg 1010 must be slightly longer than the opposing leg 1010 to permit the support structure 150 to be level.

In the illustrated example the legs on one side of the support structure 150 are attached approximately 1 inch higher than the opposing legs and are therefore 1 inch longer than the opposing legs 1010. When collapsing the legs 1010, the pair of longer legs 1010 would be folded first under the base frame 1002. The legs 1010 may be connected by a cross bar 1060 for additional support and to facilitate the folding of the legs 1010 together.

As illustrated, the longer legs 1010 are then affixed at a position closer to the base frame 1008 whereas the shorter legs is affixed at the position more distal from the base frame 1002. The longer legs 1010 are then folded against the based frame 1002 first followed by the shorter legs 1010, which then will fold on top of the longer legs 1010.

Figure 13:
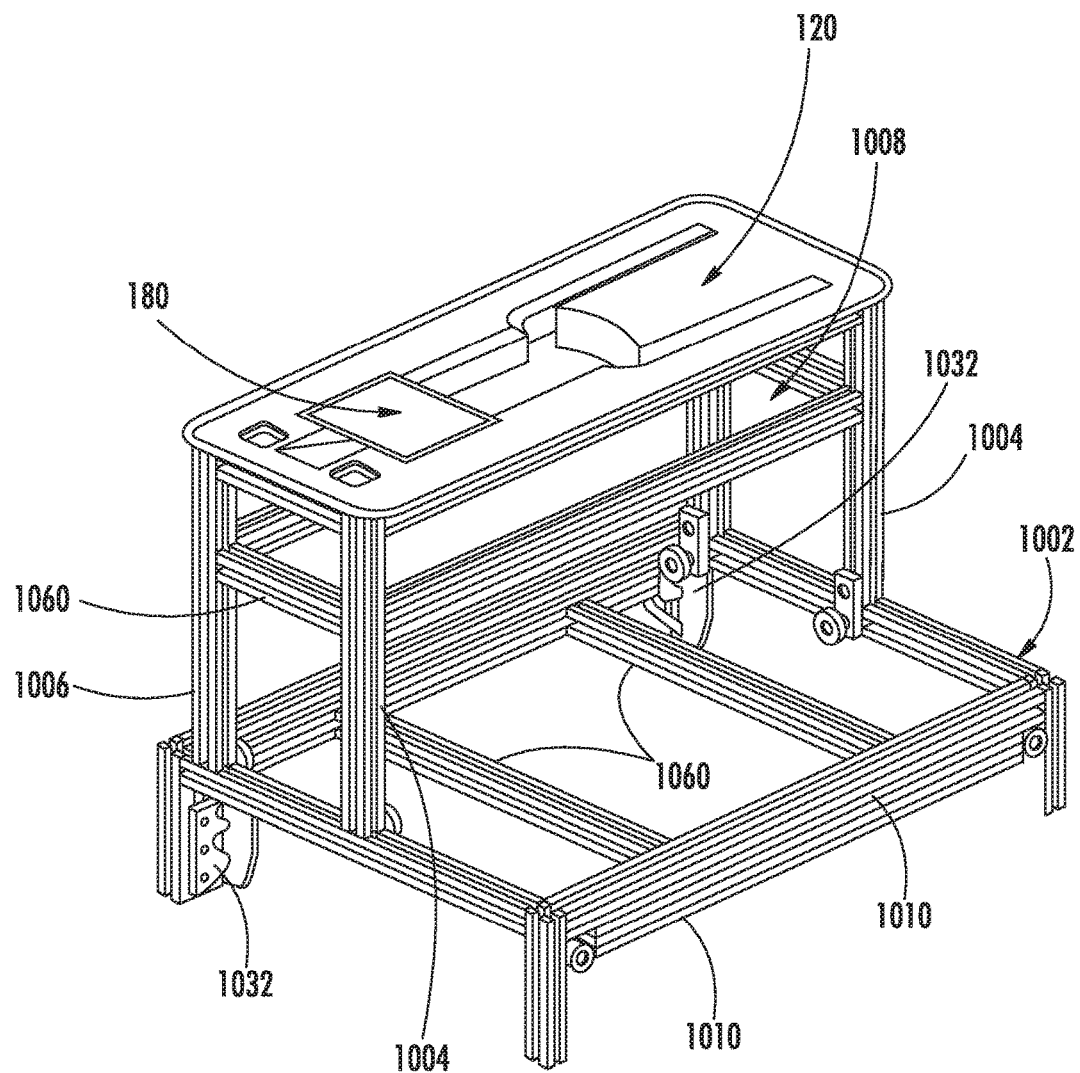
FIG. 13 illustrates a top perspective view of the surgical simulation support structure of FIG. 10 showing the legs folded under the base member.

FIGS. 13, 14 and 15 illustrate a surgical simulation support structure 150 as it would appear with the plurality of legs 1010 folded underneath the base frame 1002. In particular, FIG. 13 illustrates a top perspective view of the surgical simulation support structure 150 of FIG. 10 showing the legs folded under the base frame member. FIG. 14 illustrates a side elevation view of the surgical simulation support structure 150 of FIG. 11, and FIG. 15 illustrates a rear elevation view of the surgical simulation support structure of FIG. 11.

As illustrated and discussed above, the longer legs 1010 are connected by the pivot support structures 1032 along the connecting members closer to the base frame 1002 (approximately 1 inch higher than the opposing legs 1010). The longer legs 1010 are first released and folded inward towards the base frame 1002 such that they are positioned widthwise underneath the base frame 1002. Next, the opposing shorter leg members 1010 are then released and folded inward toward the base frame 1002 such that they are also positioned underneath the base frame 1002 but rest just below the longer leg members 1010. As illustrated in the figures, the leg members 1010 fold securely under and a fit within the boundaries of the base frame 1002.

FIGS. 16-19 illustrate several example uses of the surgical simulation tray 120 and support structure 150 in connection with a simulated surgery. In particular, FIGS. 16-19 further illustrate additional components of the assembly required to fully stimulate a realistic surgical environment.

FIG. 16 illustrates a top perspective view the surgical simulation support structure of FIG. 10 having a containment or collection bag 1600 placed within the basket 1008 of the support structure 150. The tray 120 is further positioned on the upper support portion 1040 of the basket 1008. As part of the simulation, a lightly pressurized water/paint mixture resembling blood may be provided to the simulated organs through tubing connected to the organ. In this manner, blood emulating fluid may be provided to the organ. For example, when pumped into the heart, the fluid may be pumped into a divided right pulmonary artery and a divided right superior pulmonary vein to distend and pressurize the venous and arterial systems. Static fluid pressure within the vessels may be achieved using gravity flow from a one-liter IV bag. Pressure may be limited to avoid severe pulmonary edema. Extended perfusion times (1-2 hours) may be maintained without substantial fluid leakage into the airways by preparing the porcine organ block to occlude the left mainstem bronchus to inhibit leaking and loss of pressure.

Because blood emulating fluid is provided to the organ for simulation, certain of the fluid will be released during the surgical simulation. The fluid may then be drained from the tray 120 through the drainage aperture 130 and collected in the containment bag 1600. Once the surgery is completed, the organs are disconnected from the air pump and any other extraneous devices or elements (i.e., IV for perfusion of fluids). The tray 120 and organs can then be placed within the containment bag 1600, along with any collected fluid and disposed. Another containment bag 1600 can then line the basket 1008 and another prepped tray 120 can then be placed on the basket 1008 to simulate another surgery. While the use of the containment bag 1600 is illustrated to line the basket 1008, those skilled in the art will recognize that other devices and structures, in addition to a containment bag 1600, may be utilized to line the basket 1008 and collect and remove the fluid from the surgical procedure.

Figure 17:
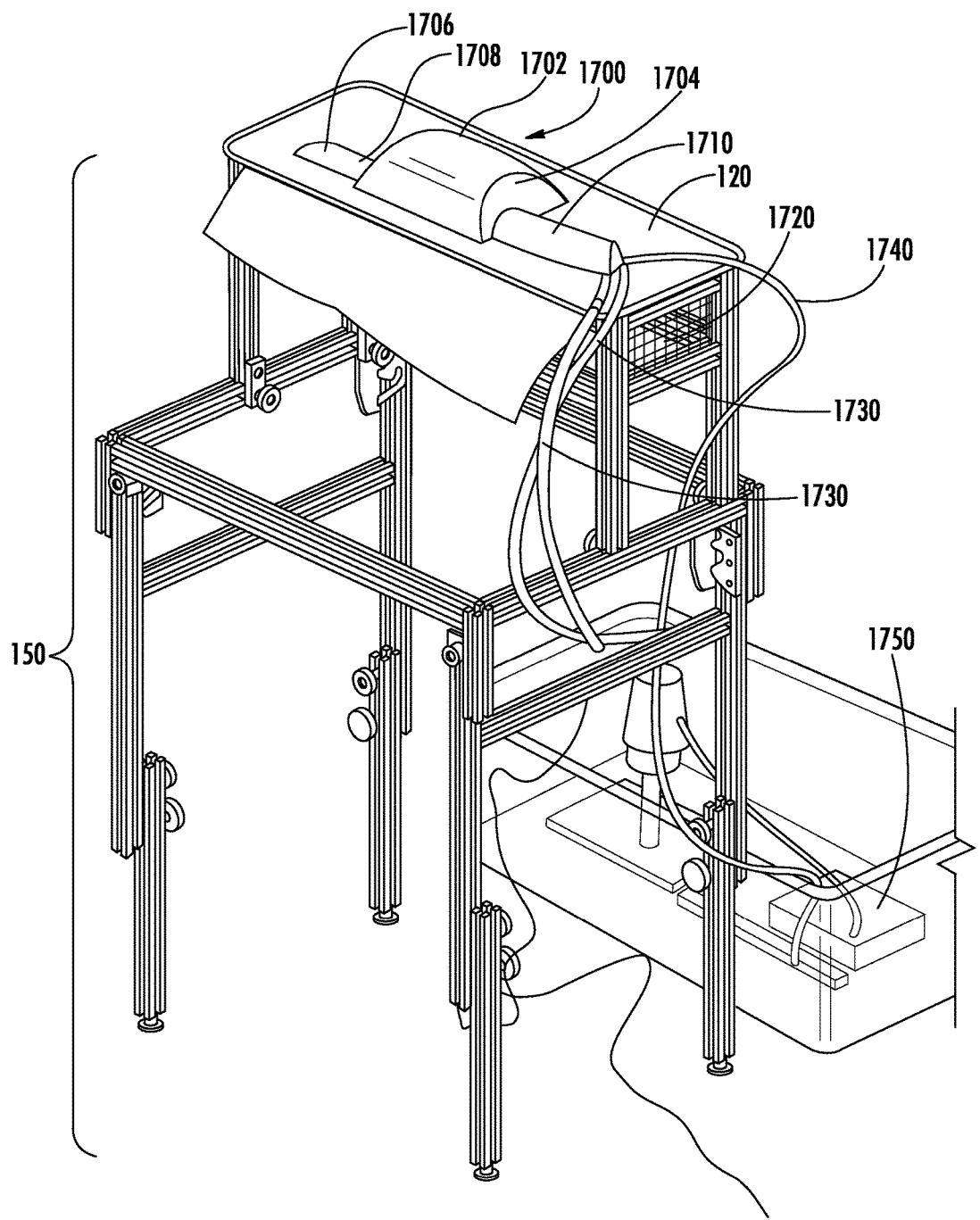
FIG. 17 illustrates a top perspective view of one example of an implementation of the surgical simulation assembly of the present invention showing a prepped pig block affixed to the surgical simulation tray.

FIG. 17 illustrates a top perspective view of one example of an implementation of the surgical simulation assembly 100 of the present invention showing a prepped organ block 1700 affixed to the surgical simulation tray 120, which in this case, is a porcine organ block. Organ blocks 1700 may consist of the heart 1702 with pericardium (not shown), lungs 1704, trachea 1706, esophagus 1708, and 10-12 inches of aorta 1710. The organ blocks are harvested from animals before butchering the animal for food products.

The affixed animal organ block heart with one or more lungs 1700 may be affixed to the tray 120 by two or more block tie ropes 1720. The organ block 1700 may be affixed, for example, by attachment to a trachea 1706 and an aorta 1710 of the heart lung block. The affixed organ block 1700 may be a pig heart lung block. Alternatively, the animal heart and lung may be a human cadaver heart and lung or may be taken from another animal.

To simulate surgery, the organs in the block 1700 are prepped with the tray 120 in advance for quick connection to a pump and other equipment used to simulate realistic surgical experience. Organ preparation starts with an incision of the pericardium on the right posterior side of the heart so that it could be reattached with no noticeable holes when viewed from the left side. The superior vena cava, inferior vena cava, right pulmonary artery, and right pulmonary veins are then divided with care taken to leave as much vessel length as possible. The right lung is then fully detached and the organs are washed extensively to remove coagulated blood from the heart and vessels. All divided vessels except for the main branch of the right pulmonary artery and right superior pulmonary vein are then tied off using 0-silk.

Small diameter plastic tubes with Luer-Lok® connectors are then placed into the divided right pulmonary artery and right superior pulmonary vein, and fixed using purse-string sutures. To create distention of the aorta, silicone caulking was injected to the level of the ascending aorta.

After the silicone has cured, the brachiocephalic trunk and left common carotid are tied off using 0-silk. Finally, the left mainstem bronchus was occluded by stapling the divided right mainstem bronchus as well as the proximal trachea. The left hilum remained unaltered, and all modifications to the heart were hidden by the pericardium during the procedure. Following preparation, the organs may be stored at 4 degrees Celsius in 10% ethanol containing ½ teaspoon of red food coloring, where they will remain fresh for at least 1 month. Alternatively, 40% ethanol can be used to preserve the organs for over a year to 18 months and still perform as well as freshly harvested organs.

The porcine organ block 1700 can be affixed to, or positioned on, the tray 120. For purposes of simulating a human, the porcine heart can be rotated to emulate the position of a human heart in a torso. For example, the left side of the porcine heart can be placed into the central indentation 122 of the tray 120 with the left lung placed over an inflatable air bladder.

provides the lung movement air. A quick connect of a fluid connection to hydraulic or fluid line 1740 joined with blood vessels allows for slightly pressured simulated blood to be provided. As used in this specification, a quick connect fitting is one that may be connected to a corresponding fitting without the use of tools. A quick connect fitting may be used to connect to hydraulic line, pneumatic line, electrical line, or digital communication bus.

Figure 18:
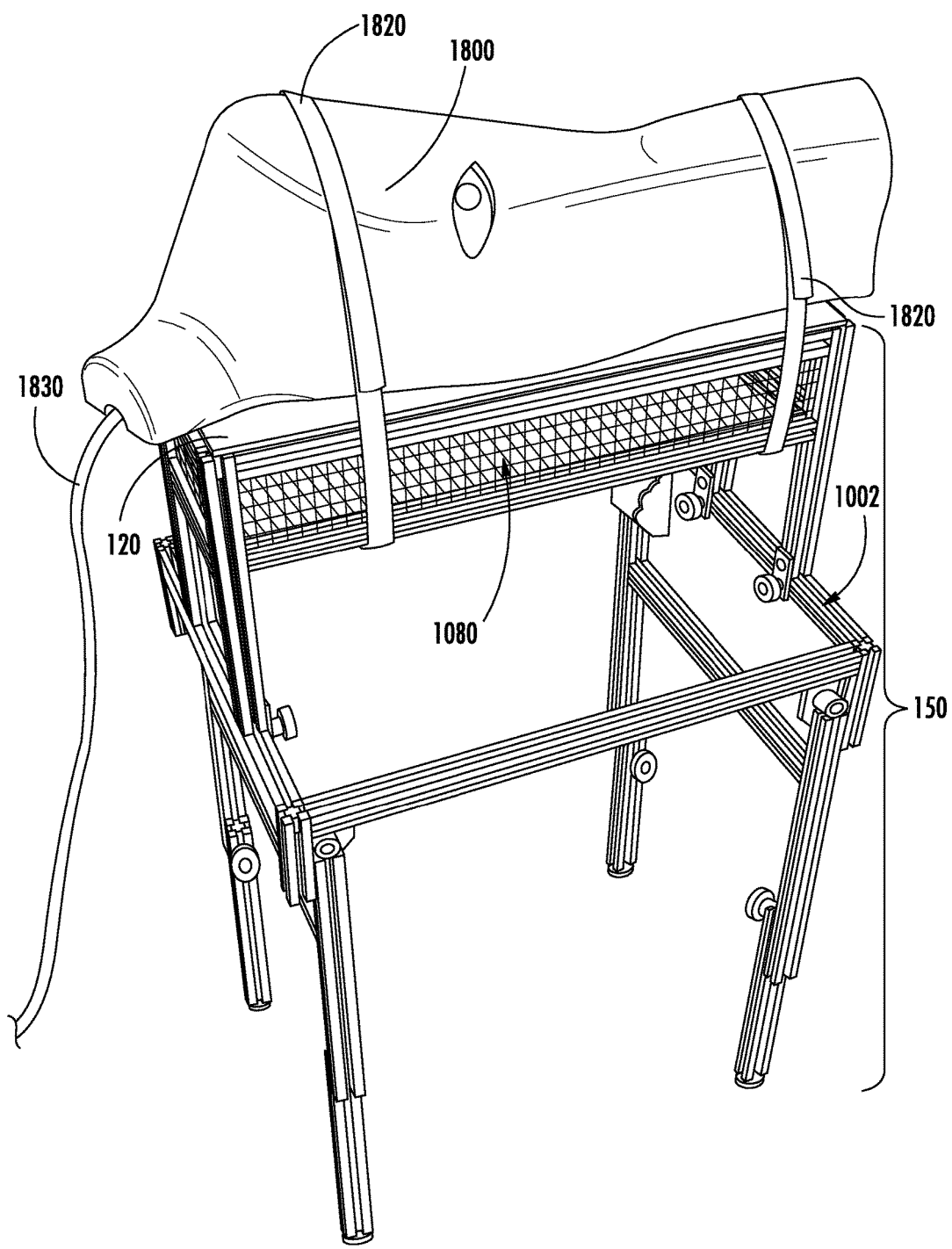
FIG. 18 illustrates a top perspective view of one example of an implementation of the surgical assembly of the present invention showing a half torso affixed to the surgical simulation tray.

Alternatively, as illustrated in FIG. 18, a half torso 1800 can be prepped for affixation to the surgical simulation tray 120. FIG. 18 is a top perspective view of one example of an implementation of the surgical assembly 100 of the present invention showing a half torso 1800 affixed to the surgical simulation tray 120 using ties 1820 and having a pneumatic tube 1830 connect to and extending from the organs from under the torso. The tray 120 and half torso 1800 are support by the support structure 150.

FIG. 19 illustrates a schematic of one example of one implementation of an air pump assembly 1900 (motor not shown) for use in connection with the present invention. As illustrated, the improved air pumping assembly 1900 is a variable speed dual action air pump capable of creating both positive pressure and vacuum. The air pump may be capable of both varying a rate of pulsation to a simulated organ and varying a pressure provided to the simulated organ.

In FIG. 19, the numbered items are represented as follows and may be constructed, for example, from the vendor parts and part numbers provided.

| No. | Description | Vendor | Vendor Part No. |
|---|---|---|---|
| 1902 | 3/10" ID Tube to 3/10" ID Tube Connector | McMaster Carr | 2653K15 |
| 1904 | ¼" NPT (female) Bulkhead Fitting | Carolina Fluid Components | Clippard 15029-2 |
| 1906 | 3/10" ID Tube Tee Fitting | McMaster Carr | 44555T1106 |
| 1908 | Check Valve 3/10" ID Tube to ¼" NPT (Male) | McMaster Carr | 1371T42 |
| 1910 | Filter for Inlet Air Check Valve and Ball Valve-1/4" NPT (Female) | McMaster Carr | 91033K25 |
| 1912 | Panel Mount Ball Valve-¼" NPT (Female) Ends | McMaster Carr | 4114T23 |
| 1914 | ¼" NPT (Male) to 3/10" ID Tube Hose Barb | McMaster Carr | 5346K110 |
| 1916 | 90° 3/10" NPT (Male) to 3/10" Tube Cylinder Fitting | McMaster Carr | 53525K110 |
| 1918 | Bimba 3" Air Cylinder | Carolina Fluid Components | 704-DXPF |
| 1920 | 3/10" ID Flexible Air Tubing | TBD | |
| 1922 | Cylinder Mount Kit | Carolina Fluid Components | Bimba D-13512-A |
| 1924 | ¼" NPT (Male) Inlet Filter for ¼" Ball Valve | McMaster-Carr | 91033K22 |

Inflation and deflation of lungs of a real patient causes the rise and fall of the mediastinum. An appropriate volume of air or some other fluid may be used to inflate and deflate an appropriately sized and placed container hidden under the tissue to be animated with movement. For example a respiration rate of 20 breaths per minute can be simulated by periodically expanding an air bladder such as a whoopee cushion, or an empty one-liter IV bag that is folded in half.

A balloon placed in the heart and connected to a closed system air source to allow for emulating the beating of a heart (such as at a rate of 710 beats per minute) adds to the sense of realism of the staged reality event.

Thus, this staged reality module could be animated by providing one quick connect fitting to connect the heart balloon to the air supply 1750 (i.e., motor) to provide the beating heart effect via pneumatic lines 1730. A second quick connect fitting to a different pneumatic line 1730

The double action air pump assembly 1900 may be driven by an electric motor (not shown). The motor may be AC or DC. The motor may be geared or direct drive; the motor may be a variable speed. In one example of an implementation, in addition to the variable speed, the pressure delivered by the pump to the simulated organ may also be variable. Air cylinder may be single or double action. With a double acting cylinder system, one need not use both of the outputs. Alternatively, one might use a single acting cylinder.

For example, two or more pumps may be used, linked on a common shaft or separately controlled by electronic means, where one of the pumps feeds a balloon placed in the atria and another pump feeds a balloon placed in the ventricles. The phase shift between the two pumps can be a variable and can be controlled by an external control computer. Alternatively, the output of the two pumps can be fed into one balloon placed in either the atria or the ventricles.

The improved air pumping assembly may further comprise a sound system capable of generating sounds of a hospital heart monitor. The sound may be a heart pulse rate monitor sound or pulse rate sound from a pulse oximeter; or other sound that provides information about vital signs in an operating room, an intensive care unit, or an ambulance. The sounds may be synchronized with the air pump.

It is to be understood that, while the invention has been described in conjunction with the detailed description, the foregoing description is intended to illustrate and not limit the scope of the invention. Other aspects, advantages, and modifications of the invention are within the scope of the claims set forth below. All publications, patents, and patent applications cited in this specification are herein incorporated by reference as if each individual publication or patent application were specifically and individually indicated to be incorporated by reference.

What is claimed is:

1. A surgical simulation tray assembly for simulating realistic surgery on animal or human tissue comprising:
   a tray having a central indentation for receiving animal or human tissue, at least one drainage aperture, and at least one indented trough extending from the central indentation for receiving at least one tube; and
   a support structure comprising
      a base frame having a front rail, a back rail, and opposing side rails, and
      a container having an upper support portion configured to maintain the tray thereon and a lower containment portion,
      a removable container liner carried by the lower containment portion for containing fluid waste drained from the drainage aperture and containing the tray and the animal or human tissue after surgery is completed,
      risers for elevating the container above the base frame, said risers being slidably connected to opposing side rails of the base frame to move the location of the container relative to the base frame from front to back, wherein the container is adjustable so as to be centered on the base frame or positioned to the front or the back along the base frame and allow a robot controlled instrument to enter the animal or human tissue from below, and
      a plurality of legs pivotably connected to the base frame to support the base frame, wherein each leg is individually adjustable in height and foldable under the base frame.

2. The surgical simulation tray assembly of claim 1 wherein the tray comprises at least one channel extending from the central indention in a direction opposite the at least one indented trough for containing additional tubing.

3. The surgical simulation tray assembly of claim 1 further comprising an animal heart with one or more lungs positioned within the central indentation and at least one tube extending from the animal heart positioned within the at least one indented trough.

4. The surgical simulation tray assembly of claim 3 wherein the additional tubing comprises a tube for the perfusion of fluid through the animal heart to simulate blood flow.

5. The surgical simulation tray assembly of claim 3, wherein the animal heart with one or more lungs comprises a pig heart lung block.

6. The surgical simulation tray assembly of claim 5, wherein the pig heart lung block is affixed to the tray and further comprising ties to affix a trachea and an aorta of the pig heart lung block to the tray.

7. The surgical simulation tray assembly of claim 1 wherein the at least one tube comprises an air hose.

8. A surgical simulation tray assembly for simulating realistic surgery on animal or human tissue comprising:
   a tray having a central indentation configured to receive the animal or human tissue and at least one drainage aperture;
   a support structure comprising
      a base frame having a front rail, a back rail, and opposing side rails,
      a container having an upper support portion configured to maintain the tray thereon and a lower containment portion,
      a removable container liner carried by the lower containment portion for containing fluid waste drained from the drainage aperture and containing the tray and the animal or human tissue after surgery is completed,
      risers for elevating the container above the base frame, said risers being slidably connected to opposing side rails of the base frame to move the location of the container relative to the base frame from front to back, wherein the container is adjustable so as to be centered on the base frame or positioned to the front or the back along the base frame and allow a robot controlled instrument to enter the animal or human tissue from below, and
      a plurality of legs pivotably connected to the base frame to support the base frame, wherein each leg is individually adjustable in height and foldable under the base frame.

9. A surgical simulation tray assembly for simulating realistic surgery comprising:
   a generally flat tray having a central indentation, at least one drainage aperture, and at least one indented trough extending from the central indentation for receiving at least one tube;
   a heart with one or more lungs positioned within the central indentation and at least one tube extending from the heart positioned within the at least one indented trough;
   an air pump assembly comprising a variable speed double action air pump for simulating the beating of the heart; and
   a support structure comprising
      a base frame having a front rail, a back rail, and opposing side rails, and
      a container having an upper support portion configured to maintain the tray thereon and a lower containment portion,
      a removable container liner carried by the lower containment portion for containing fluid waste drained from the drainage aperture and containing the tray and heart with one or more lungs after surgery is completed,
      risers for elevating the container above the base frame, said risers being slidably connected to opposing side rails of the base frame to move the location of the container relative to the base frame from front to back, wherein the container is adjustable so as to be centered on the base frame or positioned to the front or the back along the base frame and allow a robot controlled instrument to enter the heart from below, and a plurality of legs pivotably connected to the base frame to support the base frame, wherein each leg is individually adjustable in height and foldable under the base frame.

10. The surgical simulation tray assembly of claim 9 wherein the air pump assembly creates both positive pressure and a vacuum on the heart.

11. The surgical simulation tray assembly of claim 9 wherein the air pump assembly includes a sound system configured to generate sounds of a hospital heart monitor.

12. The surgical simulation tray assembly of claim 11 wherein the sounds of the hospital heart monitor are synchronized with the air pump.

13. The surgical simulation tray assembly of claim 9 wherein the air pump assembly is configured to vary a rate of pulsation to the heart and vary a pressure of air provided to the heart.

14. A method for simulating a beating heart for simulating realistic surgery comprising:
    providing a simulator heart on a tray having a central indentation that receives the simulator heart and at least one drainage aperture, and a support structure comprising a base frame having a front rail, a back rail, and opposing side rails, and a container having an upper support portion that maintains the tray thereon and a lower containment portion having a container liner;
    risers for elevating the container above the base frame, said risers being slidably connected to opposing side rails of the base frame to move the location of the container relative to the base frame from front to back, wherein the container is adjustable so as to be centered on the base frame or positioned to the front or the back along the base frame and allow a robot controlled instrument to enter the simulator heart from below, and a plurality of legs pivotably connected to the base frame to support the base frame, wherein each leg is individually adjustable in height and foldable under the base frame;
    the method further comprising,
    adjusting the height of each leg and sliding the risers on opposing side rails of the base frame to adjust the container into a position to allow positioning of a robot controlled instrument on the simulator heart during simulated surgery;
    placing at least one balloon in either the atria or ventricles of the simulator heart;
    connecting the at least one balloon to at least one pneumatic tube;
    providing a variable speed dual action air pump for simulating the beating of the simulator heart creating by both positive pressure and vacuum;
    connecting the variable speed dual action air pump to the at least one pneumatic tube;
    collecting fluid waste drained from the aperture within the container liner; and
    removing the container liner from the container that contains the drained fluid, tray and simulator heart after surgery is completed.

15. The method of claim 14 wherein the simulator heart comprises a porcine heart.

16. The method of claim 14 further comprising:
    placing at least one balloon in the atria and at least one balloon in the ventricles of the simulator heart;
    connecting each of the balloons to a pneumatic tube;
    providing two or more pumps, wherein one of the pumps feeds the balloon placed in the atria and another pump feeds the balloon placed in the ventricles; and
    operating the pumps to create a variable phase shift between the two pumps, thereby simulating a heartbeat in the simulator heart.

* * * * *